United States Patent [19]
Dorn

[11] 3,714,914
[45] Feb. 6, 1973

[54] SEWAGE DISPOSAL DEVICE

[76] Inventor: William E. Dorn, R.R. 1 Box 72 F, Miami, Fla. 33144

[22] Filed: Jan. 27, 1971

[21] Appl. No.: 110,133

[52] U.S. Cl. .................................... 110/8 R, 110/15
[51] Int. Cl. ............................................... F23g 5/12
[58] Field of Search ............... 110/8 R, 8 P, 7 R, 15

[56] References Cited

UNITED STATES PATENTS

| | | |
|---|---|---|
| 747,488 | 12/1903 | Rooke et al. ........................ 110/8 |
| 1,531,766 | 3/1925 | Trimborn et al. .................... 110/8 |
| 1,918,535 | 7/1933 | Greenawalt ...................... 110/15 X |
| 2,005,812 | 6/1935 | Thomas .......................... 110/15 X |
| 2,032,402 | 3/1936 | Colby et al. ....................... 110/15 |
| 2,062,025 | 11/1936 | Harrington ........................ 110/15 |
| 3,457,882 | 7/1969 | Ruzika ............................... 110/8 |

Primary Examiner—Kenneth W. Sprague
Attorney—Ernest H. Schmidt

[57] ABSTRACT

A sewage disposal device operative to separate solids from liquids in raw sewage and completely incinerate the solids and treat the fluids to eliminate pollution at the source of the sewage is described. A separation and filtration bucket moveable between a settling chamber for containing fluids and a combustion chamber, receives intermittent charges of of raw sewage for filtration and drainage into the fluid separation chamber and transportation and depositing of the remaining solids into the combustion chamber for drying out and complete incineration of the solids for subsequent removal as inert ash. Means is provided for further treatment of the separated liquid sewage to render it substantially pollution-free effluent.

6 Claims, 4 Drawing Figures

PATENTED JAN 6 1973

SEWAGE DISPOSAL DEVICE

This invention relates, in general, to sewage disposal devices and has particular relation to an improved sewage disposal device.

One of the main objects of the invention is to provide an improved form of sewage disposal device which can be used for the removal of all solid waste materials and other solids from the raw sewage and clarification of any remaining liquids before its disposal into any connecting drainage field or municipal sewer.

Another object of the invention is to provide a sewage disposal device that will not pass any untreated sewage into a septic tank effluent disposal field.

Another object of the invention is to provide a sewage disposal device in which all remaining liquid, after the solids have been removed, will be treated before these liquids are passed into any drainage field or sewer line.

Another object of the invention is to provide a sewage disposal device that by not passing any solid material into a drainage field or sewer line will eliminate most of the problems of clogged lines and expensive sewage treatment plants.

Another object of the invention is to provide a sewage disposal device that will not pollute any existing stream, river, lake, ocean, surface or subterranean water by removing pollution before it begins.

Another object of the invention is to provide a sewage disposal device that will make each property owner responsible for his own disposal of all raw sewage and not pass sewage on to someone else for further pollution of any community.

Another object of the invention is to provide a sewage disposal device that will not contaminate any drinking water as all solids and undesirable liquids are both removed and treated before the outfall is connected to any existing sewer or drainage field.

Another object of the invention is to provide a sewage disposal device that does not require any strong chemicals to be added to the raw sewage to eat up the solid materials and thus allowing these chemicals to further pollute the existing water supply when they are passed into the outfall of any existing drainage field or sewer line.

Another object of the invention is to provide a sewage disposal device that will incinerate all solid materials that are collected from the raw sewage and not cause any further health hazards.

Another object of the invention is to provide a sewage disposal device which will remove all sewage solids and treat all remaining liquid before the effluent is passed into a municipal sewer and thus will eliminate a costly sewage treatment plant which does not eliminate pollution and will never cure it. The outfall of such existing sewage treatment plants are known to pollute millions of gallons of fresh water, streams, lakes, rivers and oceans.

Another object of the invention is to provide a sewage disposal device that will not pass raw sewage into a municipal sewer system and will eliminate all sewer pipe joint leakage between the property owner and the sewage treatment plant, and in many cases will stop water and ground pollution and contamination from miles of existing and proposed municipal sewer lines.

Another object of the invention is to provide a sewage disposal device that will not allow sewage solids and polluted liquid to remain in a septic tank, cesspool or dry well for unlimited periods of time thus eliminating one of the greatest health hazards that faces the nation today.

Further objects and advantages of the invention will appear from the following detailed description taken in connection with the accompanying drawings in which.

Figure 1:
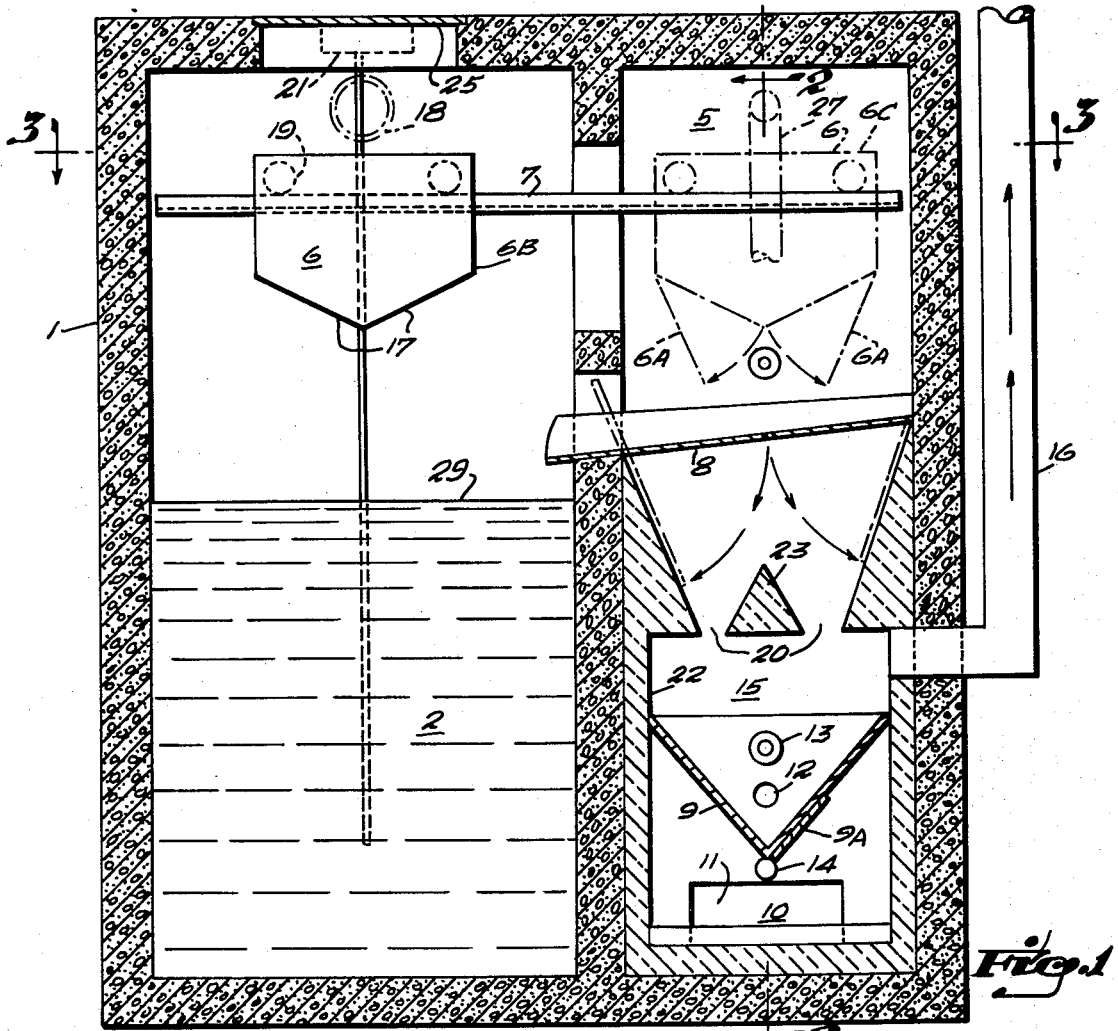
FIG. 1 is a sectional side elevational view of the sewage disposal device embodying the present invention.
Figure 3:
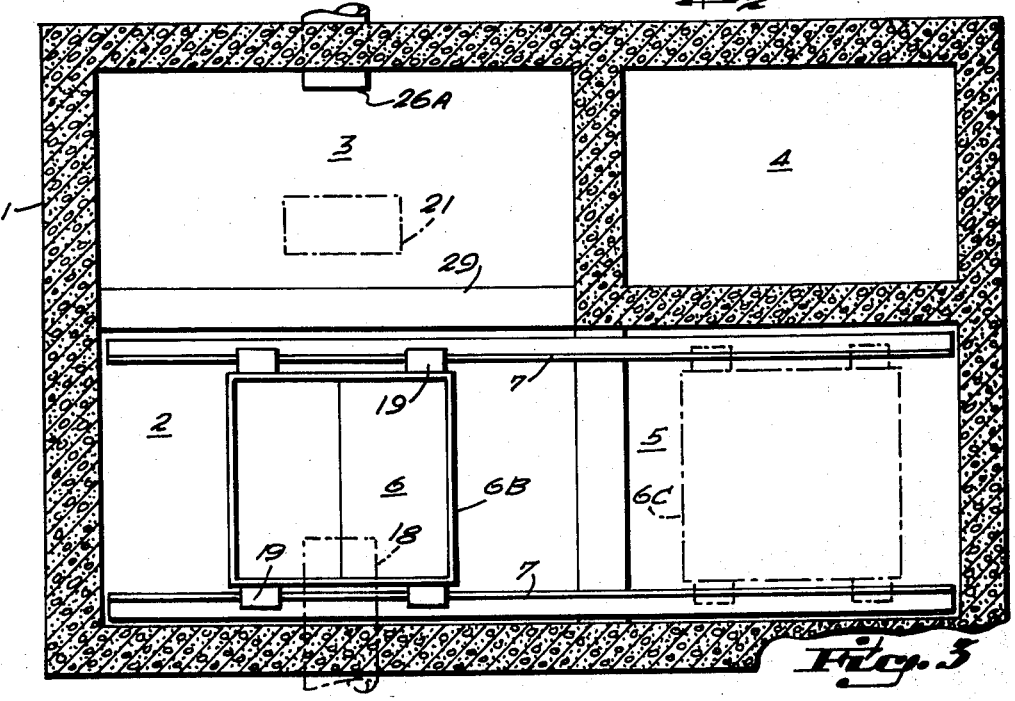
FIG. 3 is a horizontal detailed section taken on line 3—3 FIG. 1.
Figure 2:
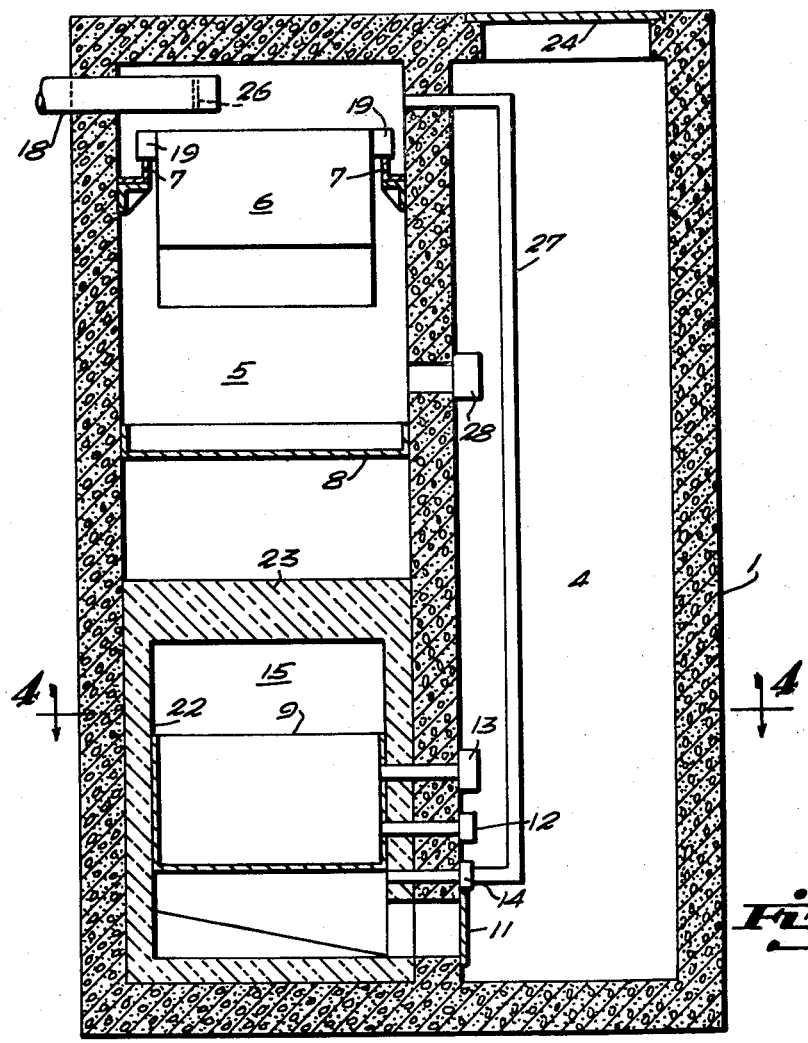
FIG. 2 is a vertical detailed section taken on line 2—2 FIG. 1.
Figure 4:
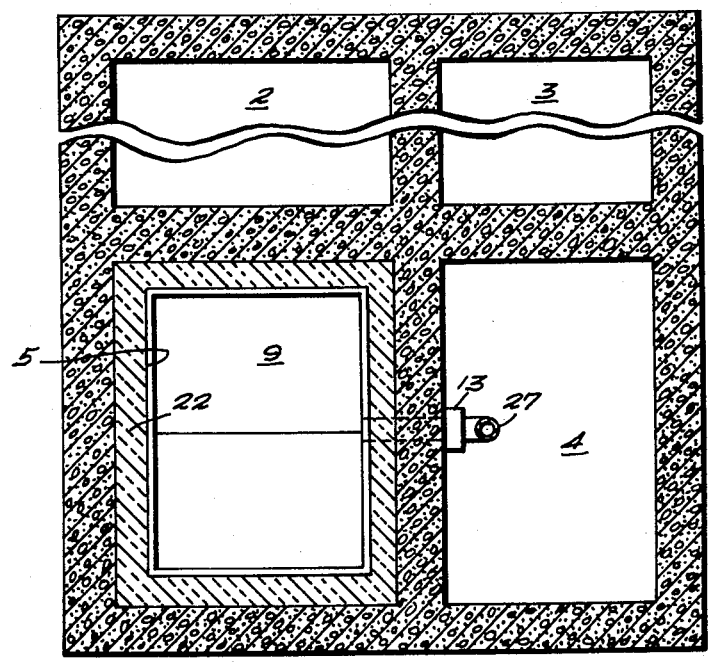
FIG. 4 is a horizontal detailed section taken on line 4—4 FIG. 2.

Referring now to the drawings, the embodiment of the invention selected for illustration, comprises outer concrete shell 1, which houses a primary settling chamber 2, also a liquid treating chamber 3, an access well 4 to allow for access to operating equipment, also equipment holding chamber 5 is located within outer concrete shell 1.

Located within equipment holding chamber 5 is a separation and filtration bucket 6 which moves on rails 7, between the primary settling chamber 2 and the equipment holding chamber 5. A drying and separation plate 8 is located directly below separation and filtration bucket 6 when it is in its operating position in equipment holding chamber 5. A cast iron grate 9 is located at the bottom of combustion chamber 15. Both cast iron grate 9 and combustion chamber 15 are located directly below drying and separation plate 8. Below cast iron grate 9 is ash pit 10. Ash pit 10 is made accessable by cleanout door 11 from access well 4. A stoker and observation port 12 is located in the wall between cast iron grate 9 and access well 4 to allow for stoking and observation of cast iron grate 9 when required. High pressure gas or oil burner 13 is located in wall between cast iron grate 9 and access well 4 and firing directly into cast iron grate 9 to incinerate all dried sewage solids to a fine ash. Cast iron grate 9 has a movable ash removal door 9A for the removal of any crystallized ash that might accumulate within iron grate 9. Oxygen generating unit 14 is located in the wall between ash pit 10 and access well 4 and leading into space in ash pit 10. Oxygen generating unit 14 is required along with gas or oil burner 13 to raise the temperature of combustion chamber 15 up to 1,800° to 2,000° F. which is required to burn all products of combustion being generated during the incineration period, especially hydrogen sulphide and sulpher dioxide gases. At the normal operation temperature of the device all of the gases given off will be burned to an odor free gas that will be discharged into the atmosphere thru outlet flue 16, thus elimination any contamination of the outside air. The separation and filtration bucket 6 is provided with two swing doors 6A which open downward from the bottom which will allow for emptying contents of filtered solids onto drying and separation plate 8. Separation and filtration bucket 6 is also provided with a specially designed filter system 17 to allow for the separation of all solids from the liquids as received from the raw sewage feed line 18. All solids are retained in separation and filtration bucket 6 while the liquid is filtered into primary settling chamber 2. Separation and filtration bucket 6 is also equipped with wheels 19 which roll on rails 7. A raw sewage feed line 18 is located in such a position as to empty any raw sewage into separation and filtration bucket 6 when it is located in its operating position 6B in primary settling chamber 2. Heat from the combustion chamber 15 passes thru adjustable vents 20 to regulate the amount of heat supplied to the drying and separation plate 8 and dry any solids that have been deposited on it by separation and filtration bucket 6 before passing the solids into the combustion chamber 15 and finally into the cast iron grate 9 for final incineration. Drying and separation plate 8 is made up as two doors which open downward at the middle to allow for the emptying of the dried solids into combustion chamber 15. Oxidizing and chlorinating unit 21 is located at the top of liquid treating chamber 3, with a feed line running to the bottom of and inside side of liquid treating chamber 3. The combustion chamber 15 and the ash pit 10 are lined with a super high temperature refractory 22 which is both non-moisture and non-spalling proof. A heat separation block 23 is located at the top of combustion chamber 15 and is used for even distribution of heat at the bottom of drying and separation plate 8. Access door 24 is located in the top of access well 4 to permit entry into same. Cleanout and access door 25 is located in the top of primary settling chamber 2. Outfall pipe 30 is located in the outside wall of liquid treating chamber 3 for the purpose of draining treated effluent into drainage field or municipal sewer line. Recirculating gas line 27 is located in access well 4 and leading from the top section of equipment holding chamber 5 to the bottom of equipment holding chamber 5 and then back into combustion chamber 15 where the final burning of unburned gases collected from top section of equipment holding chamber 5 takes place before these gases are passed thru outlet flue 16 to the outside atmosphere. Observation and stoking port 28 is located in the wall between equipment holding chamber 5 and access well 4 and leading into space just above drying and separation plate 8 to allow for observation and cleaning of excess material that has accumulated on the surface of drying and separation plate 8 when required.

The cycle of operation for the invention is thus:

The raw sewage is fed into the raw sewage feed line 18 which empties directly into separation and filtration bucket 6 when bucket is in its position in primary settling chamber 2, the separation and filtration bucket 6 then filters all raw sewage received and filtering all liquids into primary settling chamber 2 while retaining all solids. When contents is fully filtered and separated retention valve 26 which is located within raw sewage feed line 18 automatically closes to shut off any flow of sewage into primary settling chamber 2. Separation and filtration bucket 6 then automatically moves to its position 6C in the equipment holding chamber 5 where it opens its swing doors 6A and dumps its contents of solids onto drying and separation plate 8. Separation and filtration bucket 6 then returns to its position in primary settling chamber 2 and retention valve 26 automatically opens thus allowing raw sewage again to enter and fill separation and filtration bucket 6 to repeat another cycle. When solids deposited onto drying and separation plate 8 are completely dried the two doors of drying and separation plate 8 open downward and dump all dried solids into combustion chamber 15 and eventually into cast iron grate 9 where ignition takes place as gas or oil burner 13 burns all solids and generated gases completely and any ash left is deposited in the ash pit 10. The oxygen generator 14 is programmed to operate in conjunction with gas or oil burner 13 and feeds just enough oxygen into combustion chamber 15 to maintain a operating temperature of 2,000° F. The remaining liquid that has been filtered into primary settling chamber 2 passes over the baffle wall 29 and into the liquid holding chamber 3 where it receives its final treatment before it enters into the outfall and into a sewage disposal field or municipal sewer line.

The embodiment of the invention shown in the drawings are for illustrative purposes only and it is expressly understood that such drawings and the accompanying specifications are not to be construed as a definition of the limits or scope of the invention, reference being made to the appended claims for that purpose.

I claim:

1. In a sewage disposal device of the class described in combination a unitary housing, wall means within said housing forming primary settling chamber and an equipment-holding chamber, a separation and filtration bucket for extracting and containing solids filtered from raw sewage fed into said bucket, means mounting doors on the bottom of said bucket to open downward, a restricted opening in the upper portion of said wall means, support means extending through said opening into the upper portion of said settling chamber and the upper portion of said equipment-holding chamber for moveably supporting said bucket whereby said bucket may be moved from one chamber to the other, a drying and separation plate in said equipment-holding chamber directly below said filtration bucket when said bucket is in said equipment chamber, means for dumping solids in said bucket onto said drying and separation plate, said equipment-holding chamber defining a combustion chamber below said drying and separation plate, a grate within said combustion chamber, said drying and separating plate comprising means for discharging dried solids by gravity into said combustion chamber and upon said grate, a burner in said combustion chamber for incinerating solids deposited on said grate, means for supplying oxygen to said combustion chamber to insure substantially complete combustion of solids in said combustion chamber, said housing further comprising a liquid treating chamber, over-flow passage-way means for discharging filtered liquid sewage from said primary settling chamber to the said liquid-holding chamber, a raw sewage feed-line for intermittently feeding raw sewage into said filtration bucket when said bucket is in said primary settling-chamber, and a raw sewage retention valve within said raw sewage feed line for intermittently cutting off the flow of raw sewage into said filtration bucket.

2. A sewage disposal device comprising a primary settling chamber and a second chamber, a filtration bucket, means for moveably supporting said filtration bucket between limit positions over said settling chamber and said second chamber, selectively, means for supplying raw sewage into said bucket, intermittently, when said bucket is in said position over said settling chamber, a drying plate within said second chamber and directly below said bucket when said bucket in said position over said second chamber, said bucket comprising filtration means for filtering liquids from said bucket for discharge into said settling chamber when said bucket is in said position over said settling chamber, said second chamber comprising a combustion chamber beneath said drying plate, said combustion chamber having therein a grate and an ashpit beneath said grate, burner means for incinerating solids deposited upon said grate, oxygen generating means for insuring complete combustion of solids incinerated in said combustion chamber, said drying plate being operative to support for drying solids deposited thereon from said filtration bucket, said drying plate further comprising means for gravitationally releasing dry solids for deposit upon said grate for incineration.

3. The invention according to claim 1, said drying plate comprising a pair of relatively moveable doors opening and closing towards the bottom.

4. A sewage disposal system of the class described according to claim 1, and further including a liquid treating chamber for final processing of all filtered liquids received from said primary settling chamber.

5. A sewage disposal device according to claim 1, said unitary concrete housing containing an access well located adjacent to said equipment holding chamber to allow for access to operating equipment contained in said equipment holding chamber.

6. In a sewage disposal device of the class described according to claim 2, said drying plate having a coating on the upper surface to prevent the adhesion of any material deposited thereon when said drying plate is opened downward for discharging contained solids into said combustion chamber.

* * * * *